March 7, 1961
J. L. ROMAND ET AL
2,974,256
LIGHT SOURCES FOR THE SPECTRO-CHEMICAL
ANALYSIS OF SUBSTANCES
Filed April 29, 1958
2 Sheets-Sheet 1
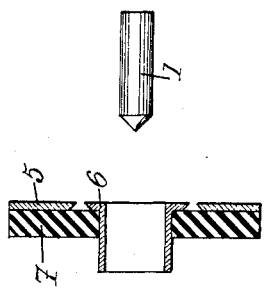
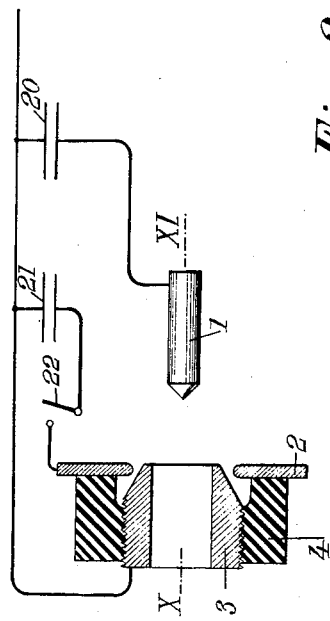
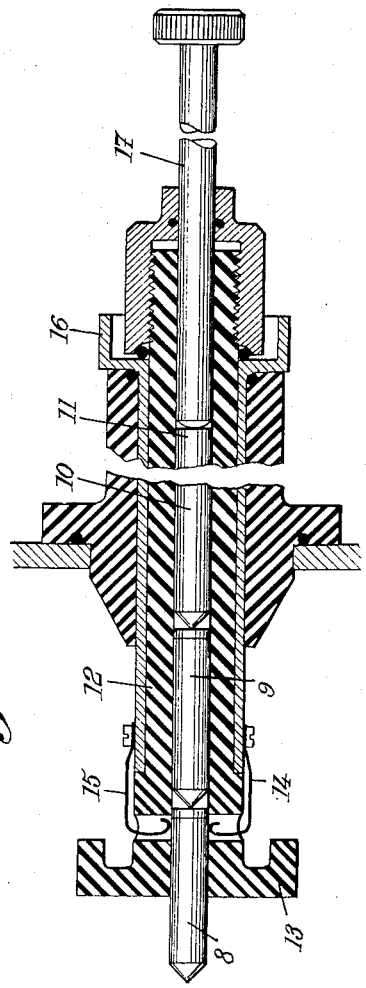
INVENTOR
JACQUES LOUIS ROMAND
BORIS VODAR
ATTORNEY

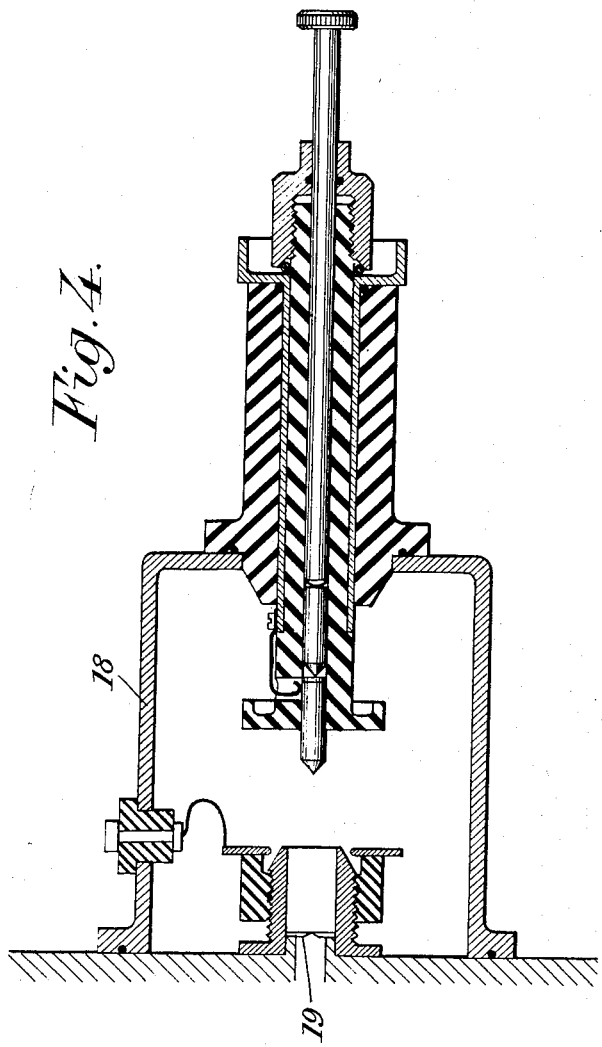

United States Patent Office 2,974,256
Patented Mar. 7, 1961

2,974,256

LIGHT SOURCES FOR THE SPECTRO-CHEMICAL ANALYSIS OF SUBSTANCES

Jacques Louis Romand, Bourg-la-Reine, and Boris Vodar, Paris, France, assignors to Centre National de la Recherche Scientifique, Paris, France, a society of France Filed Apr. 29, 1958, Ser. No. 731,674

Claims priority, application France Mar. 29, 1958

11 Claims. (Cl. 315—168)

Conventional emission spectral analysis makes use of sources constituted by arcs or sparks and permits the qualitative and quantitative analysis of materials introduced in any suitable manner into the arc or spark. It is known that the possibilities of producing sources of sparks or arcs limit the possibilities of this method to the detection of bodies the ionization potentials of which are lower than about 10 volts and the sensitive rays of which have wavelengths higher than 2000 Angstroms. About 70 elements comply with these conditions but, among the exceptions, are very important bodies such as some metalloids, like sulphur, phosphorus, carbon, and also gases like nitrogen, oxygen and hydrogen. For these substances the sensitive rays are in the so-called "remote ultra-violet" range, that is to say have wavelengths lower than 2000 Angstroms. Furthermore, these waves are emitted by ions having a high ionization degree, which are generally not produced by the usual sources.

The sensitive rays of these metalloids are in this remote spectral range merely because they correspond to strongly ionized atoms on the external electronic layer of which remain only one or two electrons, which makes their spectrum similar to that of alkaline or alkali-earth metals which have a small number of rays but of very high sensitivity (the light energy that is emitted being distributed over a small number of electronic transitions).

It is known that, in order to perform the analysis of sulphur, phosphorus and carbon, rays located at the beginning of this spectral range and of relatively easy access, between 1500 and 2000 Angstroms, have been used. These rays, corresponding to moderate degrees of ionization, are still emitted in a spark produced in a gas at a pressure close to normal pressure. In this case, the source that is used is a spark produced in a transparent gas (generally nitrogen or argon), this spark being formed in a chamber which is separated from the spectrograph, where a vacuum is maintained, by a transparent window, for instance of calcium fluoride or lithium fluoride. Such a method could not be used for lower wavelengths because no known optical material is practically transparent below 1200 or 1300 A. and also because the excitation of the sparks in gases is no longer sufficient, as above stated, to produce rays of high ionization.

In order to cover the above mentioned ultra-violet range, it is practically necessary to make use of a source operating in a vacuum, this both in order to obtain a sufficient excitation and in order to make it possible to dispense with the window which should be interposed between the spectrograph and the source if said source contained a gas at a substantial pressure. There is still another reason, which is that all substances, and in particular gases and even rare gases, have ranges of absorption which are extremely intensive in the remote ultra-violet range. A source located in a vacuum therefore constitutes the only source that can be used for the emission spectro-chemical analysis in the remote ultra-violet range.

Of course it has been known for a long time that a spark may be produced in a vacuum but in the so-called "Millikan spark" form. This discharge does not comply with the conditions of spectro-chemical analysis because the distance between the electrodes is only a fraction of a millimeter and this causes a considerable unstability of its operation. The reason of this is that the disruptive fields in a vacuum are very high, so that the potentials that are necessary must be considerable despite the small distance between the electrodes.

The so-called "sliding" spark produced in a vacuum eliminates these drawbacks and constitutes a very advantageous source for spectro-chemical analysis in the remote ultra-violet range. A sliding spark is obtained by means of two electrodes in contact with a dielectric along the surface of which the discharge slides. It is found that the potential necessary for the production of such sliding sparks in a vacuum is relatively moderate, even for a rather great interval between the electrodes (averaging several millimeters and even more); the wear of the electrodes does not produce a very great variation of the interval and the stability of operation is satisfactory. The excitation in a sliding spark under vacuum is high and the rays of the metalloids several times ionized, which are the sensitive rays of these elements, appear with intensity therein.

However, the use of a sliding spark in a vacuum has the drawback of introducing as support for the spark a foreign material the particles of which participate, at least partly, in the emission. In the analysis of some elements such as carbon, sulphur or phosphorus, by means of steel electrodes for instance, this drawback is not very serious because it is possible to find a support which is practically free from the elements to be measured; such a support is for instance constituted by a refractory oxide, for instance alumina which is commonly used and has given good results in practice. But in other circumstances the drawbacks of sliding sparks may be serious. When it is desired for instance to determine the amount of a gas, such as nitrogen, oxygen or hydrogen, present in the electrode to be analyzed, the choice of the dielectric support becomes much more difficult because it is obviously impossible to measure the amount of oxygen when the spark supporting material is an oxide. Furthermore, if the oxide is used in the usual form of a sintered polycrystalline material, the gases present therein may constitute a serious disadvantage.

Therefore the most satisfactory source from the point of view of spectro-chemical analysis will be a spark produced without support in a vacuum, easy to produce and having a high emission in the remote ultra-violet range.

The object of the present invention is to provide such a source. The problems to be solved can be summed up as follows:

(1) To obtain an easy discharge in a vacuum, or a highly rarefied gas (pressure of $10^{-5}$ mm. of mercury for instance);

(2) At the same time, during this discharge, to produce a luminous emission of a sufficiently intensive spectrum of rays containing the sensitive rays of the metalloids in the remote ultra-violet range.

Such a source may be obtained by producing in the same chamber two sparks, one of which, working in the usual conditions of production of sparks under a vacuum (with or without support, but anyway with a relatively small distance between the electrodes), serves to produce the stream of charged particles which starts the other spark, which can then take place between electrodes located at a greater distance from each other.

Our studies on the question have shown that it is possible to use such a discharge as an intensive source of rays located in the remote ultra-violet range.

The theory of operation of such a discharge in a high vacuum is based upon the following processes: emission of charged particles in the starting spark-acceleration of the negative particles, and in particular the electrons, toward the anode of the main spark, creating along their path of travel positively charged particles in the highly rarefied residual gas ($10^{-4}$ mm. of mercury). This ionization creates a neutral plasma with the elimination of space charge and this enables the electrons to reach the anode with the velocity sufficient to permit of starting the main spark.

In these processes, the light energy may be emitted in two steps, first in the residual gas during the deactivation of the ions that are formed and subsequently in the vicinity of the anode of the main spark, provided that evaporation of the material of said anode is facilitated. For the above mentioned purpose, the first phenomenon is a disadvantage since it risks of giving rise to spectral rays of the residual gas. The experiments we have conducted have shown that it is possible to obtain an intensive emission of a remote ultra-violet spectrum of the anode of the main spark while practically eliminating that of the residual gas, by facilitating the part of the discharge which takes place in the vapor of the anode owing to the use of high capacities ranging from 0.5 to 2 microfarads under voltages ranging from 20 to 40 kv. for the main discharge, while maintaining a very high vacuum (of $10^{-5}$ mm. Hg or even less) in the chamber. We thus increase the density of the vapors of the material forming the anode, which absorbs a high instantaneous energy, and we reduce the density of the molecules of the residual gas. In these conditions it has been found, by studying spectrums obtained with a spectograph having a grating placed in a vacuum, that the source thus constituted emits a spectrum which is rich in rays of the elements contained in the anode and in particular in the sensitive rays of metalloids.

The present invention has for its object a source of light for spectro-chemical analysis in the remote ultra-violet range which gives a main spark, called "analysis spark," produced in a chamber placed under a vacuum and started by an auxiliary spark called "starting spark" also produced in a vacuum and in the same chamber. One of the characteristics of this invention is that the distance between the starting spark and the anode of the analysis spark is substantially greater than in the case of the usual sparks produced in a vacuum. This distance may range from 1 cm. to several centimeters.

Such a source makes it possible to analyze metalloids and in particular gases, by spectography in the remote ultra-violet range, that is to say in the part of the spectrum located below a wavelength of 2000 A. and more especially in the range between 700 A. and 1300 A.

The auxiliary spark produces charged particles and in particular electrons which serve merely to make the highly rarefied gas of the chamber conductive and thus to start the analysis spark. Consequently, the light emission of this spark does not depend very much upon the starting spark which is not required to have stable characteristics, so that it is possible easily to solve the problem of starting the main spark. The auxiliary spark may be either a spark without support with a small distance between the electrodes, or a sliding spark produced on a dielectric support.

The analysis spark will be supplied by a condenser having a relatively high capacity so as to increase the emission of the ultra-violet spectrum of the anode rays. The capacities that are used range approximately from 0.5 microfarad to 2 microfarads under voltages ranging approximately from 20 kv. to 40 kv. The starting spark will be of relatively low power; for instance it will be supplied by a capacity of 0.1 microfarad under a voltage of 15 kv. It will be located relatively far from the anode of the analysis spark, which anode constitutes the source of light to be used. These two precautions are taken in order to avoid the production of rays of the materials of the electrodes of the starting spark in the spectrum to be studied. Experiments have fully supported these views since, if the analysis anode is made of spectroscopically pure copper, and the electrodes of the starting spark are made of iron, no ray of iron can be seen in the ultra-violet spectrum that is obtained.

The source will be placed in a gas that is extremely rarefied, at the lowest pressure compatible with the possibility of starting the electrodes. From the above theoretical considerations, it results that a total absence of residual gas would prevent the starting of the electrodes. Experiments have not permitted of verifying this probably because the vacuums that are obtained were not sufficient. According to the present invention, the vacuum should be as high as possible, account being taken of the necessity of starting the sparks, in order to reduce the light emission of the gases ionized by the discharge. A pressure averaging $10^{-5}$ mm. of mercury is satisfactory. Preferably, we use for pumping an oil diffusion pump provided with an air liquid trap so as to improve the limit vacuum that can be obtained and to avoid the organic vapors that might give rise to the emission of carbon rays. The pumping of the spark chamber will be preferably independent of that of the spectrograph in which it is not necessary to obtain a vacuum as high and as free from impurities as in the spark chamber.

Preferred embodiments of our invention will be hereinafter described with reference to the accompanying drawings, given merely by way of example and in which:

Fig. 1 is a diagrammatical view of the elements to be provided according to this invention in a light source chamber.

Fig. 2 shows a modification.

Fig. 3 shows a different anode arrangement.

Fig. 4 shows a complete light source chamber according to the invention.

In the construction of Fig. 1, the electrode 1 is the anode of the analysis spark. Electrode 2 is the anode of the starting spark and electrode 3 is a cathode common to both of these sparks. The bevelled shape of the end of electrode 3 surrounded by electrode 2 permits of adjusting the distance between electrodes 2 and 3, for instance by means of a screw-threaded insulated piece 4 screwed on the cylindrical portion of electrode 3 and carrying electrode 2. The distance between electrodes 2 and 3 must be adjusted with an approximation of some tenths of a millimeter so as to permit of using a voltage not higher than 15-20 kv. to start the spark between electrodes 2 and 3. The stream of electrons coming from the starting spark bombards anode 1 located opposite electrodes 2 and 3. The main discharge is then produced between electrodes 1 and 3 and the optical spectrum of highly ionized atoms is emitted in close vicinity to the surface of electrode 1. The rays may be observed along axis X—XI in the direction XI—X. They may also be observed along a perpendicular axis intersecting the end of electrode 1 turned toward electrodes 2 and 3.

In the embodiment illustrated by Fig. 2, the starting electrodes 5—6 are fixed on a disc 7 of an insulating or semi-conductor material so as to make it possible to obtain a sliding spark. The starting voltage may thus be lower than with the arrangement illustrated by Fig. 1. In the arrangement of Fig. 2, there might be some risk of a deposit of the vapor of the anode being formed on the insulating support, which would short-circuit the surface of said support on which the sliding spark is to be produced. In order to avoid this drawback, the edges of the starting electrodes 5 and 6 are bevelled so that at least a portion of the surface of element 7 is protected.

With arrangements such as have been described with reference to the drawings, the radiations emitted by electrode 1 are characteristic of the material of said electrode, that is to say there are no radiations emitted by ions coming from the material of electrodes 2—3 or 5—6. This is absolutely true for heavy ions, that is to say those of most of the metals or metalloids which may appear in the starting spark without support of the embodiment of Fig. 1. When the starting spark is of the type illustrated by Fig. 2, it is advantageous to use as dielectric support of this spark a refractory material, that is to say a material which is little volatile, and the components of which emit spectrums which produce but little rays, as it is the case with alumina. These precautions are taken in order to reduce as much as possible the risk of having the analysis spark soiled by the auxiliary spark.

A particular case is that where it is desired to detect gases in the material which constitutes the electrode to be analyzed. If the starting spark is a sliding spark as obtained with the arrangement of Fig. 2, the support of this spark must be a material the components of which do not contain the element to be analyzed. The analysis of oxygen, nitrogen or hydrogen present in metals is an application of very great industrial interest. In order to carry it out we take, for instance, a support for the starting spark made of an alkaline or alkali-earth halide. Among these substances, calcium fluoride gives particularly satisfactory results. In a general manner, whatever be the type of the starting spark, when the analysis is concerned with gases, it is desirable to replace the residual gases of the spark chamber by a known gas which has no influence on the analysis. As a matter of fact, the residual gases have a composition which is not well known but they certainly contain at least water vapor, carbonic acid gas and probably oxygen, nitrogen, hydrogen and carbon monoxide. As a consequence, if they participate, even very little, in the emission that is detected by the spectrograph, an analysis of gases, and in particular of oxygen, contained in the anode may be slightly modified. In this case, we produce in the low pressure chamber ($10^{-5}$ mm. of mercury) a stream of a rare gas such as argon, through any suitable means well known in the art.

It is pointed out that the light source according to our invention is extremely well adapted to the analysis of gases present in solids since the pressure under which this chamber is working is already very low and thus any contamination of the electrodes by the atmosphere in which they are present is reduced to a minimum. For a similar analysis with an ordinary spark produced at atmospheric pressure, it would be necessary to have the spark swept with a neutral gas containing only a proportion of impurities lower than $10^{-8}$ in relative value.

It seems that the shape of the anode has no great importance. However, a conical shape facilitates the spectrum emission. This freedom concerning the shape of the electrodes is a particular advantage in the case of industrial analyses in series.

For analytic applications, a great advantage of the source according to the present invention lies in the fact that a single electrode of the material to be analyzed is necessary, to wit that which constitutes the anode of the source. This characteristic permits of providing devices for making tests in series on several electrodes successively without having to effect several pumping operations in the spark chamber. For this purpose we advantageously make use of the device illustrated by Fig. 3, which is intended to ensure the positioning and removal of the electrodes without air being introduced into the spark chamber. The electrodes to be analyzed, designated by reference numerals 8, 9, 10, 11 (their number is not limitative) are disposed behind one another in a tubular extension 12 one end of which, located opposite the starting spark 2—3 or 5—6, includes a part of larger diameter 13 intended to act as a screen. This tubular extension 12 is made of a material which is insulating and refractory. The electrode that is being used, to wit 8, is kept in position by four strong springs, such as 14—15, which are electrically connected with the conductor tube 16 which serves to feed the electric voltage to said springs. Springs 14—15 have a double purpose. On the one hand, they keep the electrode in position and on the other hand they act as connections between the electrode and the source of voltage. Replacement of one of the electrodes by another one is effected in a simple manner by pushing the whole of the electrodes from the outside by means of a rod 17 mounted in a gas-tight manner. Electrode 8 is driven off from the end of the tubular extension 12, drops into a basket located at the bottom of the spark chamber and electrode 9 comes into working position. It should be well understood that this arrangement is described merely by way of example and that it might be modified without departing from the scope of the invention. For instance the means for locking the electrode that is in active position and for feeding current thereto might include balls pushed by springs located in holes provided in tubular extension 12, and perpendicular to the axis thereof. Fig. 4 shows, by way of example, the arrangement of the above described devices in a spark chamber 18 provided with an entrance slit 19 for the spectograph.

The electric lay-out for connecting the electrodes with the sources of current may be arranged as diagrammatically illustrated by Fig. 1. Between electrodes 1 and 3 (or between electrodes 1 and 6), there is directly applied the voltage across the terminals of a condenser 20, the capacity of which ranges from 0.5 to 2 microfarads, and which is charged with direct current under a voltage ranging from 20 to 40 kv., electrode 1 constituting the anode. Between electrodes 2 and 3 or 5 and 6, there is periodically applied a voltage impulse collected from the terminals of a condenser 21 having a capacity which ranges from 0.05 to 0.20 microfarad charged with direct current under a voltage ranging from 10 to 20 kv., electrode 2 or 5 forming the anode of the circuit. The application of this impulse may be effected through any suitable means, for instance by a mechanical switch 22. The time of exposure that is commonly used corresponds to 100 sparks, at the rate of 1 spark per second.

We will now give some indications concerning the possibilities of the light source above described for the detection of elements having a high ionization potential and contained as traces in the material of the anode to be analyzed.

Our experiments have shown that it is possible to use the 933.382 and 944.517 A. rays of $S_{VI}$ for sulphur, the 1117.974 and 1128.006 A. rays of $P_V$ for phosphorus, the 977.026 and 1176 A. rays of $C_{III}$ for carbon, the 1238.800 and 1242.778 A. rays of $N_V$ for nitrogen, the 1031.912 and 1037.613 A. rays of $O_{VI}$, 1338.603 and 1343.3 A. rays of $O_{IV}$, the 1371.287 A. ray of $O_V$, and the rays of $O_{II}$ and $O_{III}$ in the vicinity of 834 A. for oxygen, the 1215.668 A. ray of $N_I$ for hydrogen, the 1393.73–1402.73–1128.826–1122.495–818.121–815.060 A. rays of $Si_{IV}$ for silicon.

In a general manner, the source can be used for any analysis of traces of elements having persistent rays in the remote ultra-violet range, the basic element being of any kind whatever. In particular, when the material to be analyzed is not a conductor, it may be reduced into powder and packed in an axial channel provided in an electrode of pure aluminum. The spectrum that is emitted then includes, in addition with the rays of aluminum, those of the material introduced into the channel.

The source according to our invention may be used in combination with a spectrograph working in a vacuum with concave grating and with normal or grazing incidence, more generally with a spectrograph with a normal incidence grating. Fig. 4 shows the lay-out of the source with respect to the entrance slit of the spectrograph.

The device shown by Fig. 3 permits of successively examining within a short time a series of samples constituted by anodes previously placed in the tube which is then evacuated. Another problem of high industrial interest is the quick analysis of a steel sample. The sample may also be introduced into the tube (such as 12) through a gas-tight introduction system of small volume. The spark chamber can then remain under vacuum and it will even be possible to avoid the use of a vacuum valve between the spark chamber and the spectrograph.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. A light source for use in a spectral analysis apparatus comprising, in combination, means forming an evacuated chamber, a cathode mounted in said chamber, a main anode mounted in said chamber and spaced from said cathode, an auxiliary anode disposed closely adjacent the cathode and means for producing a starting spark between the auxiliary anode and the cathode in the evacuated chamber for initiating a spark between the main anode and the cathode so that the spectrum of the main anode may be analyzed in a vacuum.

2. For use in a spectral analysis apparatus, a light source which comprises, in combination, means forming an evacuated chamber, two main electrodes mounted in said chamber, said electrodes comprising an annular cathode and an anode disposed on the axis of said annular cathode and at a distance therefrom ranging from about one to several centimeters, a condenser of a capacity ranging from about 0.5 to 2 microfarads under a voltage ranging from about 20 to 40 kv. having its terminals connected with said main electrodes respectively, an auxiliary anode coaxial with said cathode at a distance therefrom ranging from about 0.1 to 3 millimeters, said auxiliary anode being at a distance from said anode practically equal to the distance from said cathode to said main anode, and electric means for producing a starting spark between said auxiliary anode and said cathode.

3. A device according to claim 11 in which the portion of said tubular cathode surrounded by said auxiliary anode is of bevelled shape and said auxiliary anode is movable axially with respect to said cathode, so that the interval between said cathode and said auxiliary anode is adjustable.

4. A device according to claim 2 including, between said cathode and said auxiliary anode, an annular part made of a material of the group consisting of insulators and semi-conductors, so that the starting spark is a spark sliding along the surface of said part.

5. A device according to claim 4 in which the respective edges of said cathode and said auxiliary anode that face each other are bevelled to prevent short-circuiting of said part.

6. A device according to claim 4 in which said part is made of a refractory oxide.

7. A device according to claim 4 in which said part is made of alumina.

8. A device according to claim 4 in which said part is made of calcium fluoride.

9. For use in a spectral analysis apparatus, a light source which comprises, in combination, means forming an evacuated chamber, a tubular cathode carried by the wall of said chamber and extending transversely thereto, the portion of the wall of said chamber surrounded by the base of said tubular cathode being provided with a slit, a main anode mounted in said chamber on the axis of said tubular cathode, in line therewith and at a distance therefrom ranging from about one to several centimeters, a condenser of a capacity ranging from about 0.5 to 2 microfarads under a voltage ranging from about 20 to 40 kw. having its terminals connected with said electrodes respectively, an auxiliary anode surrounding said cathode at a distance therefrom ranging from about 0.1 to 3 millimeters, and electric means for producing a starting spark between said auxiliary anode and said cathode.

10. For use in a spectral analysis apparatus, a light source which comprises, in combination, means forming an evacuated chamber, a tubular cathode carried by the wall of said chamber and extending transversely thereto, the portion of the wall of said chamber surrounded by the base of said tubular cathode being provided with a slit, a tubular extension of an insulating material extending through the wall of said chamber opposite said tubular cathode and in line therewith, a plurality of cathodes mounted one behind the other in said tubular extension, means projecting from the external end for controlling the axial positions of said cathodes in said tubular extension, resilient means for yieldingly holding the first of said anodes so that it projects from said extension and is located at a distance from said cathode ranging from about one to several centimeters, a condenser of a capacity ranging from about 0.5 to 2 microfarads under a voltage ranging from about 20 to 40 kv. having its terminals connected with said electrodes respectively, an auxiliary anode surrounding said cathode at a distance therefrom ranging from about 0.1 to 3 millimeters, and electric means for producing a starting spark between said auxiliary anode and said cathode.

11. For use in a spectral analysis apparatus, a light source which comprises, in combination, means forming an evacuated chamber, an annular cathode mounted in said chamber, a main anode mounted in said chamber on the axis of said annular cathode and at a distance from said cathode ranging from about one to several centimeters, a condenser of a capacity ranging from about 0.5 to 2 microfarads under a voltage ranging from about 20 to 40 kv. having its terminals connected with said electrodes respectively, an auxiliary anode surrounding said cathode at a distance therefrom ranging from about 0.1 to 3 millimeters, and electric means for producing a starting spark between said auxiliary anode and said cathode.

References Cited in the file of this patent

UNITED STATES PATENTS

| | | |
|---|---|---|
| 2,414,363 | Dietert et al. | Jan. 14, 1947 |
| 2,541,877 | Machler | Feb. 13, 1951 |
| 2,703,374 | Fruengel | Mar. 1, 1955 |
| 2,793,323 | Miller | May 21, 1957 |
| 2,818,527 | Pearson | Dec. 31, 1957 |
| 2,833,963 | Tognola | May 6, 1958 |

UNITED STATES PATENT OFFICE
CERTIFICATE OF CORRECTION

Patent No. 2,974,256                            March 7, 1961

Jacques Louis Romand et al.

It is hereby certified that error appears in the above numbered patent requiring correction and that the said Letters Patent should read as corrected below.

Column 2, lines 29 and 31, for "cathodes", each occurrence, read -- anodes --.

Signed and sealed this 4th day of September 1962.

(SEAL)
Attest:

ERNEST W. SWIDER                              DAVID L. LADD
Attesting Officer                               Commissioner of Patents